US005488937A

United States Patent [19]
Kuze

[11] Patent Number: 5,488,937
[45] Date of Patent: Feb. 6, 1996

[54] TEMPERATURE CONTROL SYSTEM FOR KEEPING TEMPERATURE OF AN ELEMENT OF AN INTERNAL COMBUSTION ENGINE AT A CONSTANT VALUE

[76] Inventor: Yoshikazu Kuze, 31-3, Higashimagome 1-chome, Ohta-ku, Tokyo, Japan

[21] Appl. No.: 285,982

[22] Filed: Aug. 4, 1994

[30] Foreign Application Priority Data

Aug. 13, 1993 [JP] Japan .................................. 5-232549
Nov. 2, 1993 [JP] Japan .................................. 5-306967

[51] Int. Cl.⁶ ................................................. F02G 5/00
[52] U.S. Cl. ........................ 123/552; 123/41.08; 123/557
[58] Field of Search ........................... 123/41.08, 41.09, 123/41.29, 41.31, 552, 557

[56] References Cited

U.S. PATENT DOCUMENTS

| | | | |
|---|---|---|---|
| 1,300,600 | 4/1919 | Giesler | 123/552 |
| 3,593,694 | 7/1971 | Hilborn | 123/41.31 |
| 3,851,629 | 12/1974 | Mayr et al. | 123/41.08 |
| 4,351,284 | 9/1982 | Ludwig | 123/545 |
| 4,386,584 | 6/1983 | Calkins | 123/41.08 |
| 4,520,767 | 6/1985 | Roettgen et al. | 123/41.31 |
| 4,768,492 | 9/1988 | Widmer et al. | 123/41.31 |
| 4,864,974 | 9/1989 | Aso | 123/41.31 |
| 5,275,231 | 1/1994 | Kuze | 123/41.1 |

FOREIGN PATENT DOCUMENTS 8631754 8/1987 Germany .

Primary Examiner—Noah P. Kamen
Attorney, Agent, or Firm—Flynn, Thiel, Boutell & Tanis

[57] ABSTRACT

A control thermostat is connected to a liquid cooling system of an internal combustion engine. The control thermostat has an inlet housing part, an outlet housing part, both housing parts being connected each other to form a valve passage therein. A thermo-actuator is provided in the valve passage. A valve member is provided on an actuating rod of the thermo-actuator so as to be operated by the thermo-actuator. The inlet housing part and the outlet housing part are connected to coolant passages of the liquid cooling system so that a part of the coolant in the cooling system flows from the inlet housing part to the outlet housing part by passing through the valve passage. The thermo-actuator is arranged so as to close the valve when the coolant temperature in the outlet housing part is higher than a set temperature of the thermostat, and to open the valve when the coolant temperature is lower than the set temperature, so that the temperature of the coolant in the outlet housing part is kept at a constant value during engine operation. A jacket is provided for transmitting heat of the coolant discharged from the outlet housing part to an element of the internal combustion engine to thereby control an operating temperature of the element to a generally constant value during engine operation.

2 Claims, 12 Drawing Sheets

TEMPERATURE CONTROL SYSTEM FOR KEEPING TEMPERATURE OF AN ELEMENT OF AN INTERNAL COMBUSTION ENGINE AT A CONSTANT VALUE

BACKGROUND OF THE INVENTION

The present invention relates to a temperature control system for an internal combustion engine having a liquid cooling system, and more particularly to a control system whereby the temperature of an element in the engine is controlled to be held constant. The element is, for example, a conduit for fluid used in the engine, such as air and fuel.

In an electronic fuel injection system of the automotive engine, in order to inject fuel at a proper air-fuel ratio and at a fuel injection timing, engine operating conditions such as engine speed, and quantity and temperature of intake air and fuel temperature are detected by a plurality of sensors to obtain electric signals. The detected signals are applied to a computer to calculate a proper air-fuel ratio and injection timing in dependence on the engine operating conditions. Accordingly, the system is complicated in structure and manufacturing cost is increased.

SUMMARY OF THE INVENTION

An object of the present invention is to provide a temperature control system by which the temperature of an element in the fuel injection system of the engine, such as a throttle body, a fuel pipe in a fuel injector, or a discharge pipe of an air cleaner, is controlled to a predetermined constant value irrespective of engine operating conditions, thereby preventing the engine from experiencing icing or vapor-lock conditions, and reducing the number of sensors and hence decreasing manufacturing cost of the fuel injection system.

In the present invention, a thermostat is provided for holding the temperature of the element constant in accordance with the coolant of the engine, thereby eliminating the above described disadvantages. The thermostat comprises a thermo-actuator having a high operability, high sensitivity, and a long life.

According to the present invention, there is provided a temperature control system for an internal combustion engine having a liquid cooling system including a radiator, a cooling thermostat for controlling coolant, the system comprising a control thermostat having an inlet side housing, an outlet side housing, both the housing being communicated with each other to form a valve passage therein, a thermo-actuator provided in the valve passage, a valve slidably mounted on the rod at a projected end portion.

The inlet side housing and the outlet side housing are communicated with coolant passages of the liquid cooling system so that the coolant in the cooling system flows from the inlet side housing to the outlet side housing passing through the valve passage. A heat exchanger means is provided for transmitting heat of the coolant discharged from the outlet side housing to an element of the internal combustion engine, whereby controlling temperature of the element to a constant value.

These and other objects and features of the present invention will become more apparent from the following detailed description with reference to the accompanying drawings.

DETAILED DESCRIPTION OF THE PREFERRED EMBODIMENTS

Figure 1:
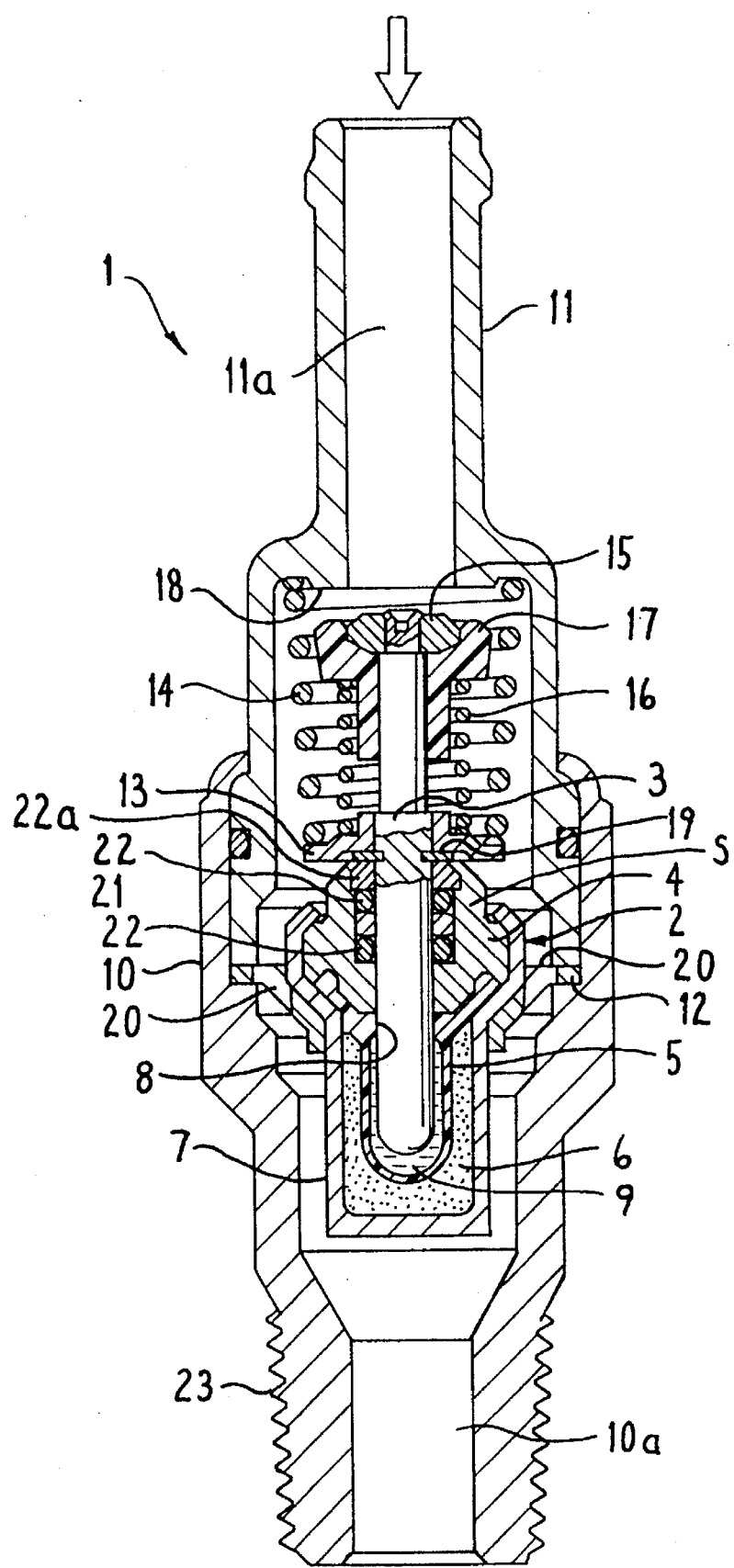
FIG. 1 is a sectional view of a thermostat of a temperature control system according to the present invention in which a valve is in a fully opened state.

Referring to FIG. 1, a control thermostat 1 for a temperature control system according to the present invention comprises a two part housing having an inlet housing part 11, an outlet housing part 10 fixedly mounted on the inlet housing part 11. The housing parts, together, define a valve passage extending through the interior thereof. The system also has a thermo-actuator 2 mounted in the valve passage.

The thermo-actuator 2 comprises an actuating steel rod 3, a guide member 4 slidably mounted on the rod 3, and a resilient seal bag 5 watertightly secured to the guide member 4. The seal bag 5 is inserted in a heat conductive cylinder 7 closed one end and filled with wax pellets 6, and the guide member 4 is securely mounted in the open end of the cylinder 7 to close the otherwise open end. The seal bag 5 has an opening and a seal as at 8 engaged with the rod 3. A gap a provided between the interior wall of the bag 5 and the rod 3. The wall thickness of the bag 5 is reduced to a very small value. The thickness, for example, is between 20% and 2% of the diameter of the rod 3. The gap width approximately equals the wall thickness of the seal bag 5. The seal bag is filled with lubricating oil 9. The lubricating oil 9 is prevented from leaking from the bag by the seal 8 engaged with the rod 3.

Further, a seal device S is provided between the guide member 4 and the rod 3 so as to prevent the lubricating oil from leaking out of the seal bag 5, and foreign material from entering in the seal bag. The seal device S comprises a movable separator 21, a pair of upper and lower 0-rings 22 on opposite sides of the separator 21, and a retainer 22a mounted on the upper O-ring 22 held in position by the structure of the guide member 4. The rod 3 projects from the guide member 4 toward the inlet housing part 11.

Attached to the cylinder 7 is a retainer 12 having a plurality of openings 20. The retainer 12 engages with a shoulder portion formed in the inner wall of the housing 10 and secured thereto by an end of the housing 11. A valve member 17 having a cylindrical shape and made of rubber is slidably mounted on a distal end portion of the rod 3. The housing 11 has a valve seat 18 conforming to and opposing the valve member 17. An C-ring 19 is engaged with the rod 3, and a spring retainer 13 is mounted on the rod 3, engaged with the C-ring 19.

A return coil spring 14 is provided between a shoulder portion formed on the inside wall of the housing 11 adjacent the valve seat 18 and the spring retainer 13 so as to urge the rod 3 in the axial direction of the housing 11 toward the housing part 10. A collar 15 is fixed to the rod 3 at the distal end thereof for preventing the valve member 17 from disengaging from the rod. A valve spring 16 is provided between the valve member 17 and the spring retainer 13 surrounding the rod 3 so as to urge the valve member 17 toward the valve seat 18. The housing part 11 has an inlet coolant passage 11a therein, and the housing part 10 has an outlet coolant passage 10a. Both passages 11a and 10a communicate with each other through the openings 20. The valve member 17 is operated to control the flow of coolant which enters the housing 11 as shown by an arrow, which will be described hereinafter in detail. The housing part 10 has an outer thread 23 formed on a lower end portion thereof.

When the temperature of the coolant rises in excess of a predetermined value of the thermostat 1, the wax 6 thermally expands. Since the bag 5 has a very thin wall thickness, the expansion of the wax 6 causes the pressure of the lubricating oil 9 in the seal bag 5 to increase up to a value equivalent to the pressure of the wax 6. The pressure of the lubricating oil is exerted on the rod 3 to urge it upwardly, a illustrated in FIG. 1 and hence the bag 5 is in a floating state between the wax 6 and the lubricating oil 9 which are balanced in pressure. Thus, the rod 3 is upwardly moved.

In this state, since the seal bag 5 does not participate in lifting the rod 3, the life time of the thermo-actuator 2 is appreciably lengthened.

Because of the very thin wall thickness of the seal bag 5, the diameter of the heat conductive cylinder 7 can be reduced. The more the diameter of the cylinder 7 becomes small, the more the strength of the cylinder increases. As a result, the thickness of the wall of the cylinder 7 can be reduced, which causes an increase in the of thermo-sensitivity of the cylinder and a reduction of the thermo-actuator 2 in size and weight.

To the contrary, the diameter of the rod 3 can be increased. The pressure of the wax 6 in the cylinder 7 necessary for lifting the rod decreases in reverse proportion to the square to the diameter of the rod 3. Consequently, the pressure of the wax 6 and hence the pressure of the lubricating oil 9 reduce largely with the increase of the diameter of the rod 3. This also elongates the life time of the thermo-actuator.

Figure 3:
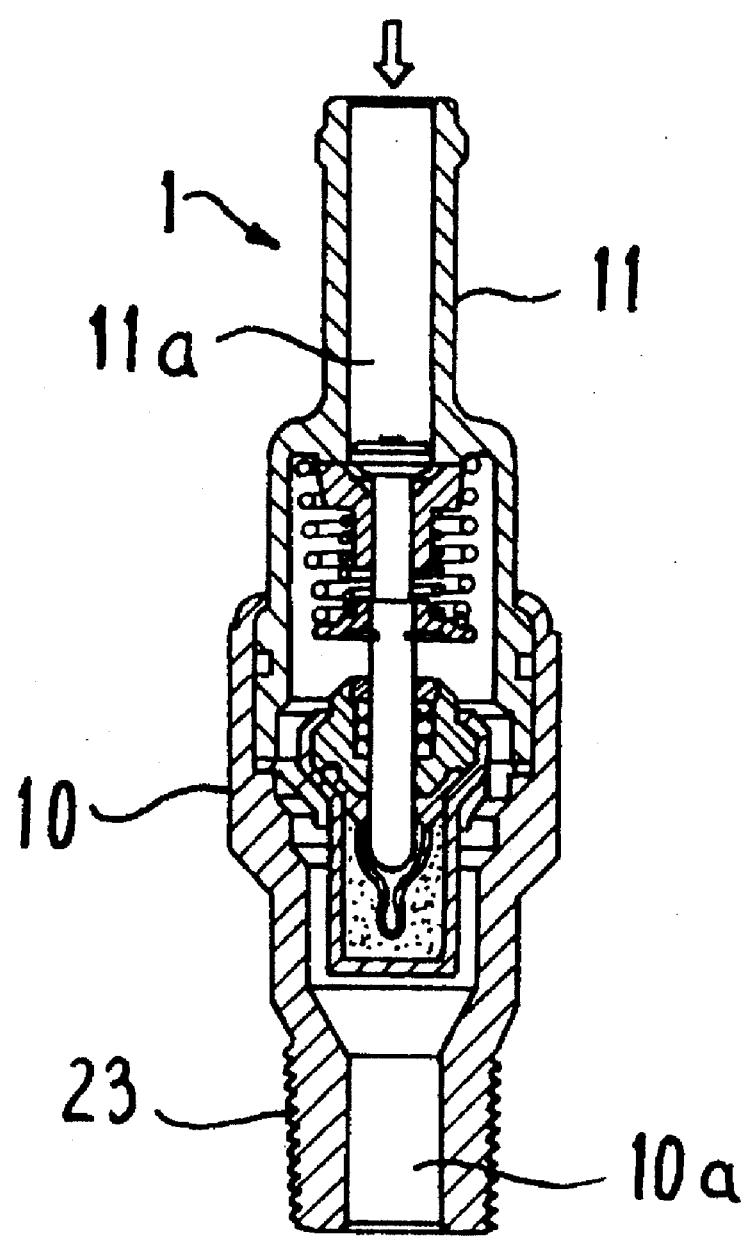
FIG. 3 is a sectional view showing a full-scale thermostat.

FIG. 3 shows a full-scale thermostat 1 having a diameter of 3 mm.

Figure 2:
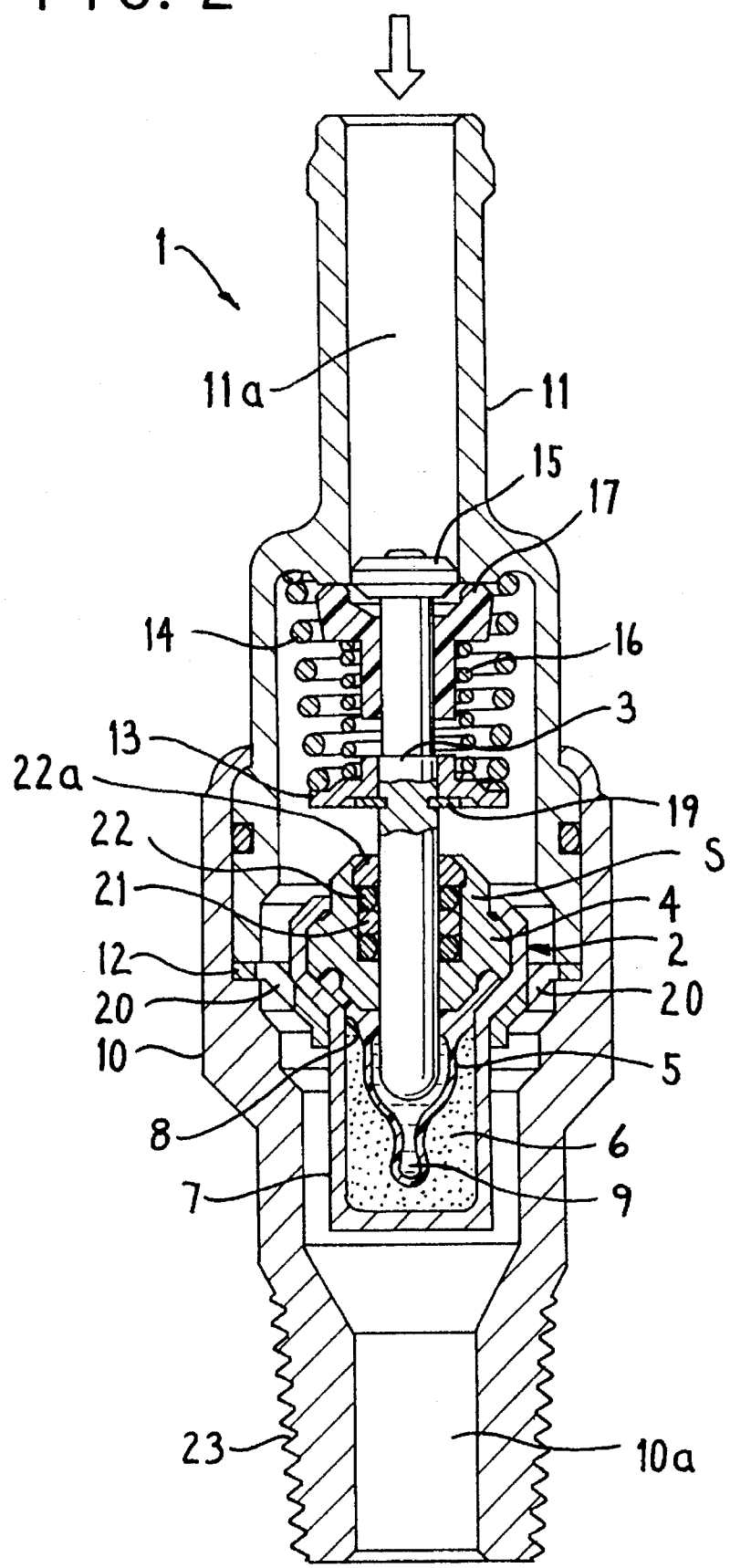
FIG. 2 is a sectional view of the thermostat in a closed state.

FIG. 2 shows the condition where the rod 3 is raised to a maximum lift position against the spring 14. The valve member 17 is engaged with the valve seat 18 of the housing 11 and the passage 11a of the collar 15 is engaged with an inside wall of the housing 11.

When the coolant temperature reduces, the wax 6 contracts. Thus, the coil spring 14 causes the valve member 17 to lower to the open position as shown in FIG. 1.

Figure 4:
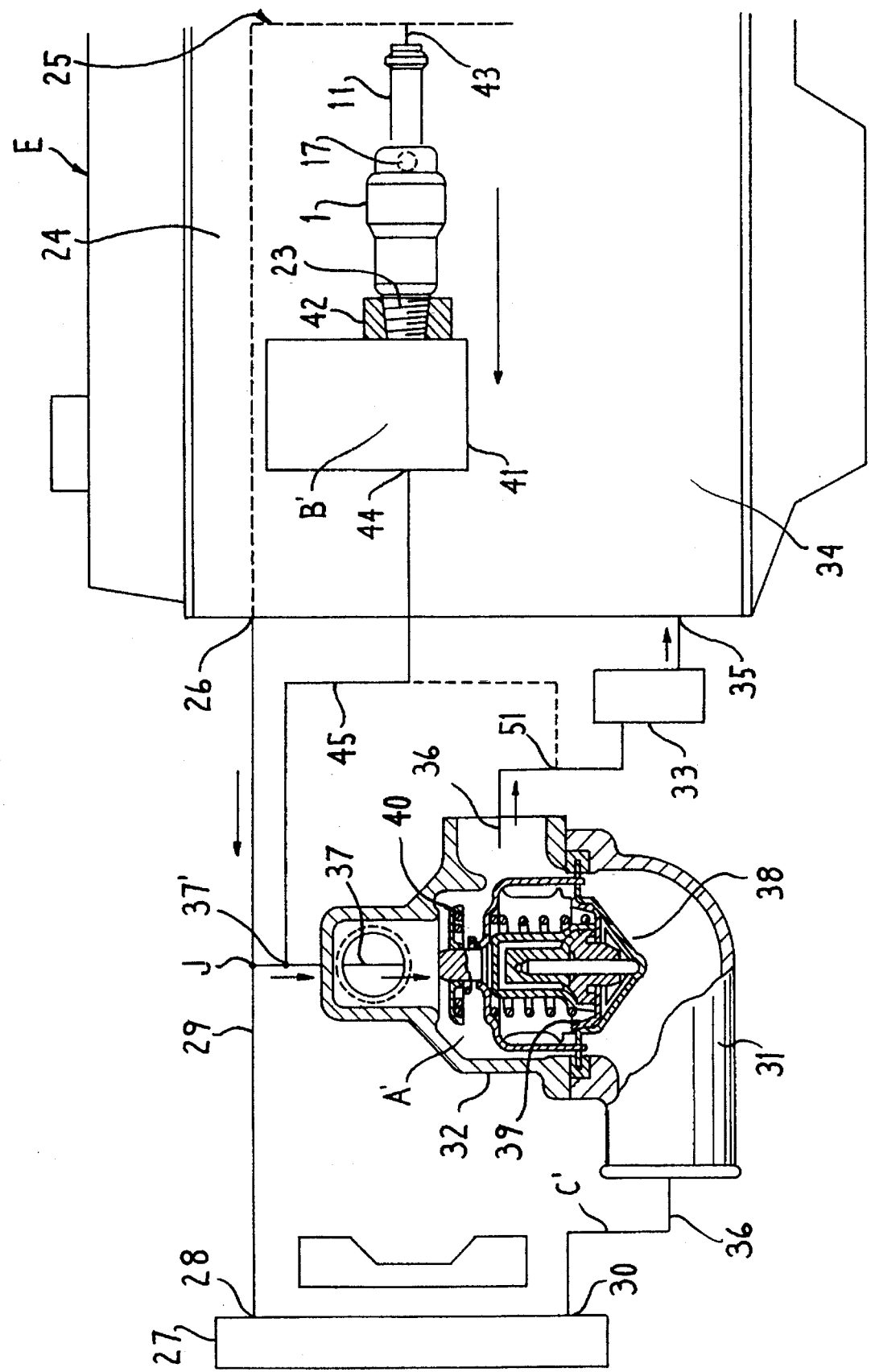
FIG. 4 is a schematic diagram showing an automotive engine cooling system as an embodiment of the present invention.

FIG. 4 shows an automotive engine cooling system to which the thermostat 1 of the temperature control system of the present invention is applied. The cooling system comprises a first coolant passage 29 disposed between an upper outlet 26 of water jackets 24 of an engine E and an upper inlet 28 of a radiator 27, and a second coolant passage 36 provided between a lower outlet 30 of the radiator 27 and a lower inlet 35 of a cylinder block 34 of the engine E, including a thermostat cap 31, a thermostat housing 32 and a water pump 33. A bypass passage 37 is provided between a junction J of the first passage 29 and the thermostat housing 32 so as to communicate the first passage 29 with the second passage 36 without passing the radiator 27.

A coolant thermostat 38 for the engine is secured to the housing 32 by the thermostat cap 31. The coolant thermostat 38 has a main valve 39 and a bypass valve 40.

The thermostat 1 is disposed between a coolant passage 25 drawn from the water jackets 24 and a junction 37' of the bypass passage 37 at upstream side of the bypass valve 40.

A constant temperature holding jacket 41 as a heat exchanger is provided for holding the temperature of an element of the engine constant in accordance with the engine coolant. The thread 23 of the thermostat 1 is engaged with an inlet 42 to the jacket 41. An end of the passage 11a of the housing part 11 of the thermostat 1 is connected with the passage 25 through an inlet passage 43. An outlet 44 of the jacket 41 is communicated with the junction 37' through a discharge passage 45.

Figure 8:
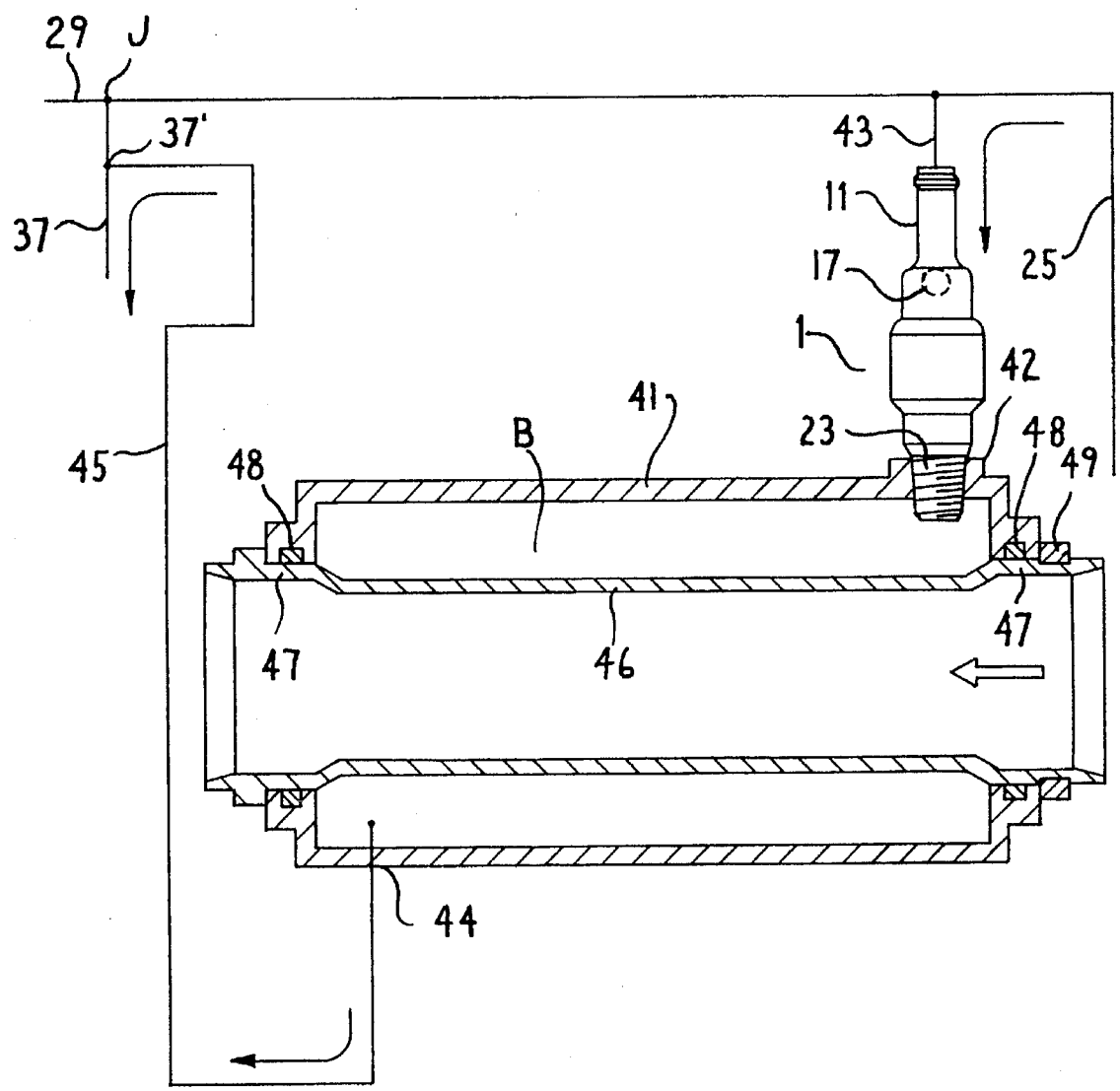
FIG. 8 is a schematic sectional view showing the temperature control system for controlling a throttle body in a fuel injection system of the automotive engine.

Referring to FIG. 8, the constant temperature holding jacket 41 is mounted on a throttle body 46 of a fuel injection system (not shown). The jacket 41 has ferrules formed at the opposite ends thereof. The ferrules are engaged with the end portions 47 of the throttle body 46 through O-rings 48 and watertightly secured thereto through a snap ring 49.

The thermostat 1, connected to the passage 25 through the passage 43, is secured to the jacket 41 by engaging the thread 23 with the thread of the inlet 42. The outlet 44 is connected to the junction 37' through the passage 45. Thus, the coolant is circulated in the jacket 41.

In the cooling system of FIG. 4, during the time that the engine is warmed up, the main valve 39 of the coolant thermostat 38 is closed, while the bypass valve 40 integrated with the main valve is fully opened. Thus, the coolant drawn from the outlet 26 of the water jackets 24 does not pass to the radiator 27. The coolant is circulated by the water pump 33 through the junction J of the first passage 29, bypass passage 37, housing 32, water pump 33 and inlet 35 of the water jackets 24 as indicated by arrows. Thus, the temperature of the coolant quickly rises.

At this time in the temperature control system, the coolant of the passage 25 is partly .introduced into the thermostat 1 through the passage 43 and circulated through the jacket 41, passage 45, junction 37', water pump 33, and inlet 35 of the cylinder block 34.

The operation of the temperature control system will be described with reference to measured records shown in FIGS. 5, 6 and 7.

In Fig, 4, the reference A' designates a measuring point for measuring the temperature of the coolant in the housing 32, B' designates a measuring point provided in the jacket 41, and C' designates a measuring point for measuring the flow rate of the coolant in the second passage 36 at the upstream side of the housing cap 31.

A pipe used for each of the first and second coolant passages 29 and 36 is of 24 mm diameter, a pipe used for the bypass passage 37 is of 10 mm diameter, and a pipe used for each of the passages 43 and 45 is of 5.5 mm diameter. The maximum flow rate of the coolant at the point C' passing through the radiator 27 is 48 liters per minute. The valve element 17 in the thermostat 1 is raised 2 mm and closed at 40° C.

Figure 5:
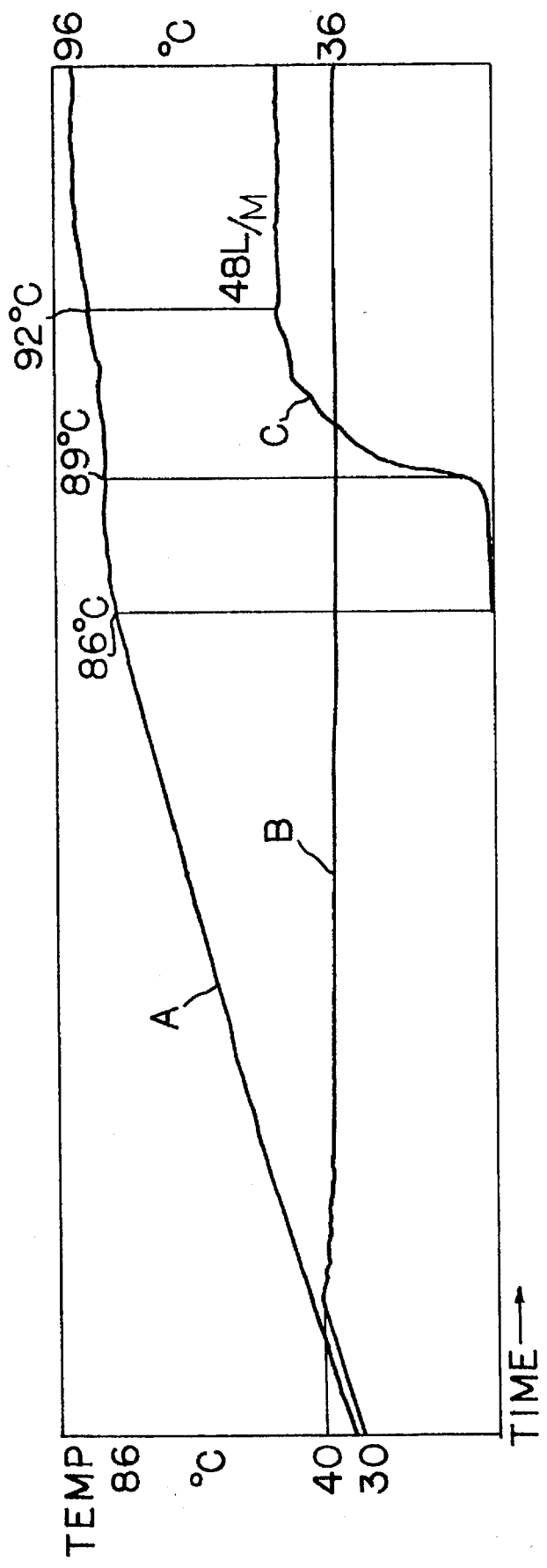
FIG. 5 shows a graph showing changes of temperature and flow rate of the coolant of the engine with respect to the time.

As shown in FIG. 5, during idling of the engine, a temperature A of coolant at the point A' in the housing 32 and a temperature B of coolant at the point B' in the jacket 41 quickly rise at a difference 3° C. between the temperatures A and B. The temperature A rises up to 96° C. On the other hand, when the temperature B becomes 40° C., the valve member 17 is closed so that the coolant is not circulated to the thermostat 1. Thus, temperature B is stopped from rising.

At an initial stage, the thermostat 1 sensitively operates to open and close the valve member 17 at change in temperature of ±0.5° C. As the difference between temperatures A and B becomes large, the thermo-actuator 2 is slightly lifted up due to the heat transmitted through the housing part 11. Thus, the valve member 17 is firmly closed, so that the temperature B does not exceed 40° C.

However, due to the thermal conductivity of the housing part 11 and the housing part 10, the temperature of the wax is higher by 4° C. compared with the temperature B in the jacket 41. Therefore, if temperature B becomes 36° C., the valve member 17 does not open, so that the temperature B does not rise.

During the warming-up of the engine, when the temperature A rises to 86° C. at which the main valve 39 starts to open, the temperature B is lowered by 4° C. and becomes 36° C. Thereafter, when the temperature B is lowered by 0.5° C., the valve member 17 is opened to introduce the coolant having a high temperature A. When the temperature B rises by 0.5° C., the valve member 17 is closed to hold the temperature constant at 36° C irrespective of the transient state of the motor vehicle such as acceleration and deceleration.

The flow rate C of the coolant at the point C' is zero during the closing of the main valve 39. When the temperature A of the coolant becomes 86° C., the main valve 39 begins to open. The flow rate C quickly increases at 89° C. When the bypass valve 40 completely closes at 92° C., the flow rate C increases up to 48 liters per minute (L/M).

Figure 6:
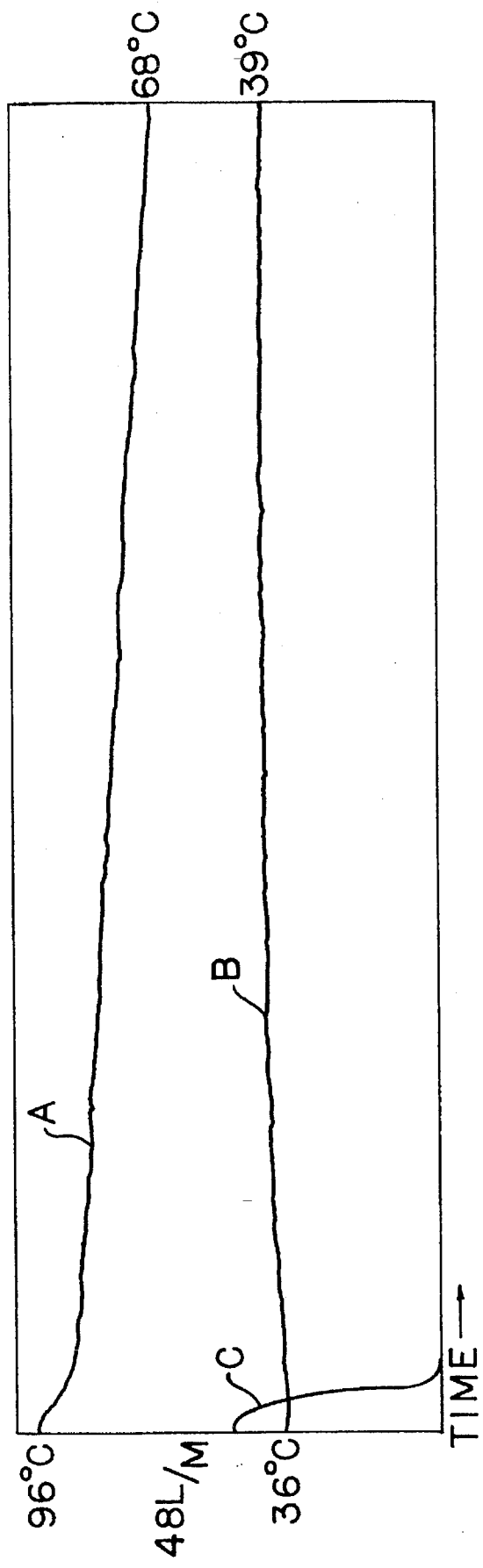
FIG. 6 shows a graph showing changes at a stop of the engine.
Figure 7:
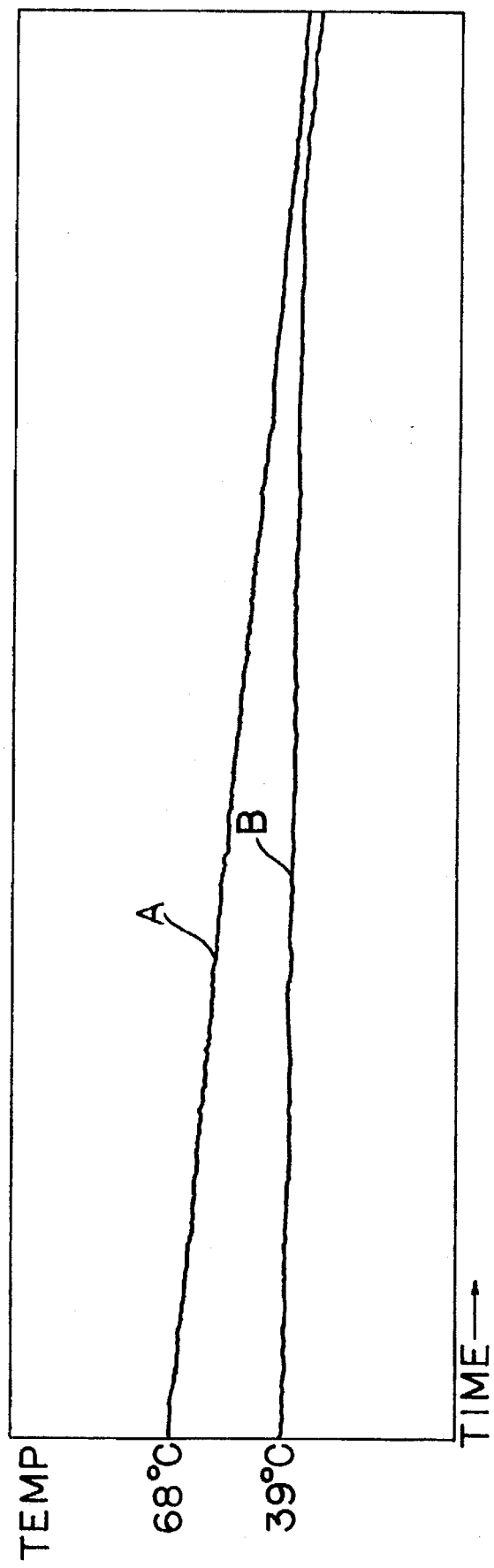
FIG. 7 shows a graph showing changes after FIG. 6.

As shown in FIG. 6, when the engine stops, the flow rate C becomes zero. The temperature A gradually decreases and the temperature B gradually rises. However, the temperature B does not exceed 40° C. Although, the difference between the temperatures A and B is reduced, temperatures do not across with each other, keeping a difference of 3° C. as shown in FIG. 7.

Thus, the temperature of intake air in the throttle body 46 is held constant in a range of a predetermined value irrespective of engine operating conditions.

Although the discharge passage 45 of the jacket 41 is connected to the bypass passage 37 at the upstream side of the bypass valve 40, the passage 45 may be connected to the water pump 33 at an upstream point 51, as shown by a dotted line in FIG. 4.

Figure 9:
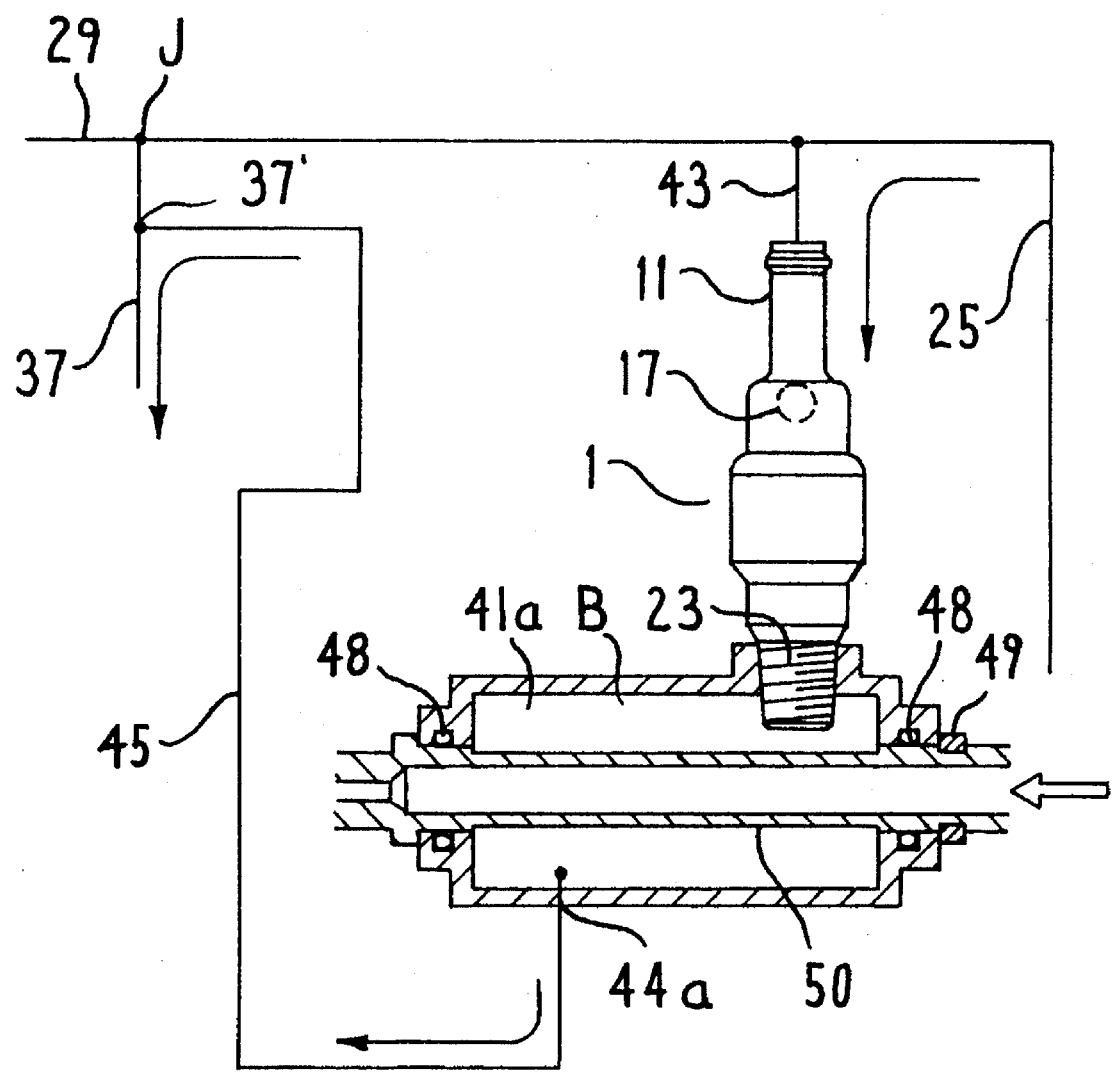
FIG. 9 is a schematic sectional view showing a modification of the system for controlling a fuel pipe in the fuel injection system.

FIG. 9 shows a modification of the system. A constant temperature holding jacket 41a is connected to the thermostat 1 in the same manner as the previous embodiment, and mounted on a fuel pipe 50 of a fuel injector (not shown) of the fuel injection system for holding the temperature of fuel constant. The jacket 41a is engaged with the fuel pipe 50 through O-rings 48 and watertightly secured thereto by the snap ring 49. An outlet 44a of the jacket 41a is connected to the bypass junction 37' through the passage 45.

The coolant is circulated in the jacket 41a in the same manner as that of FIG. 8 and the description thereof is omitted.

Figure 10:
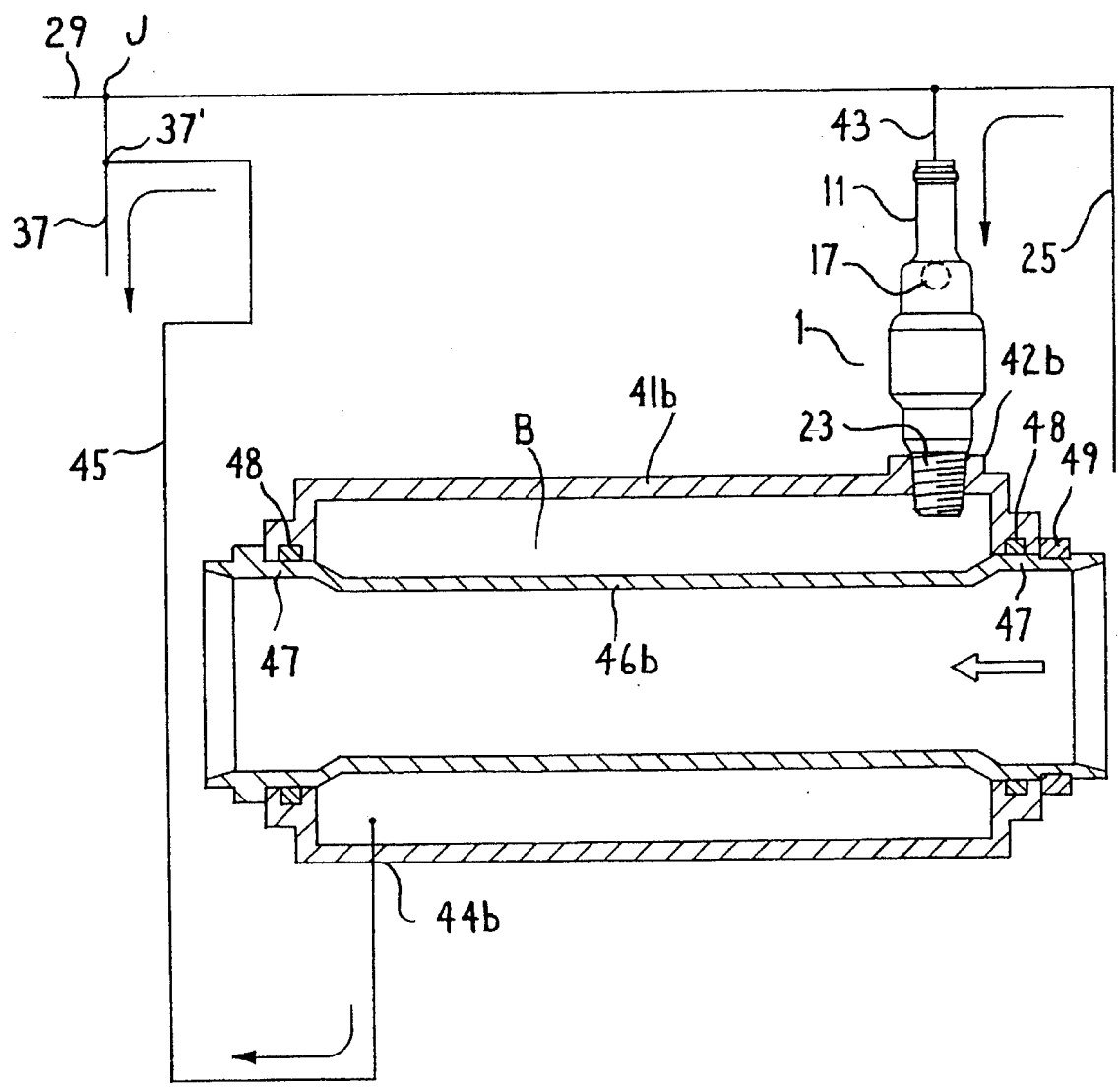
FIG. 10 is a schematic sectional view showing another modification of the system for controlling an air cleaner.

FIG. 10 shows another modification. A constant temperature holding jacket 41b is provided for holding the temperature of intake air passing through an intake pipe 46b connected to an outlet of an air-cleaner (not shown). An outlet 44b of the jacket 41b is connected to the bypass junction 37' through the passage 45. Other construction is the same as that of FIG. 8 and the same parts are identified with the same references as FIG. 4.

Thus, the temperature of the intake air discharged from the air cleaner is held constant. Since the system is to control the temperature of the intake air, the object is the same as FIG. 8. Therefore, either of the systems can be selected in dependence on a situation.

The system of FIG. 10 is effective for the carburetor of the engine.

Figure 11:
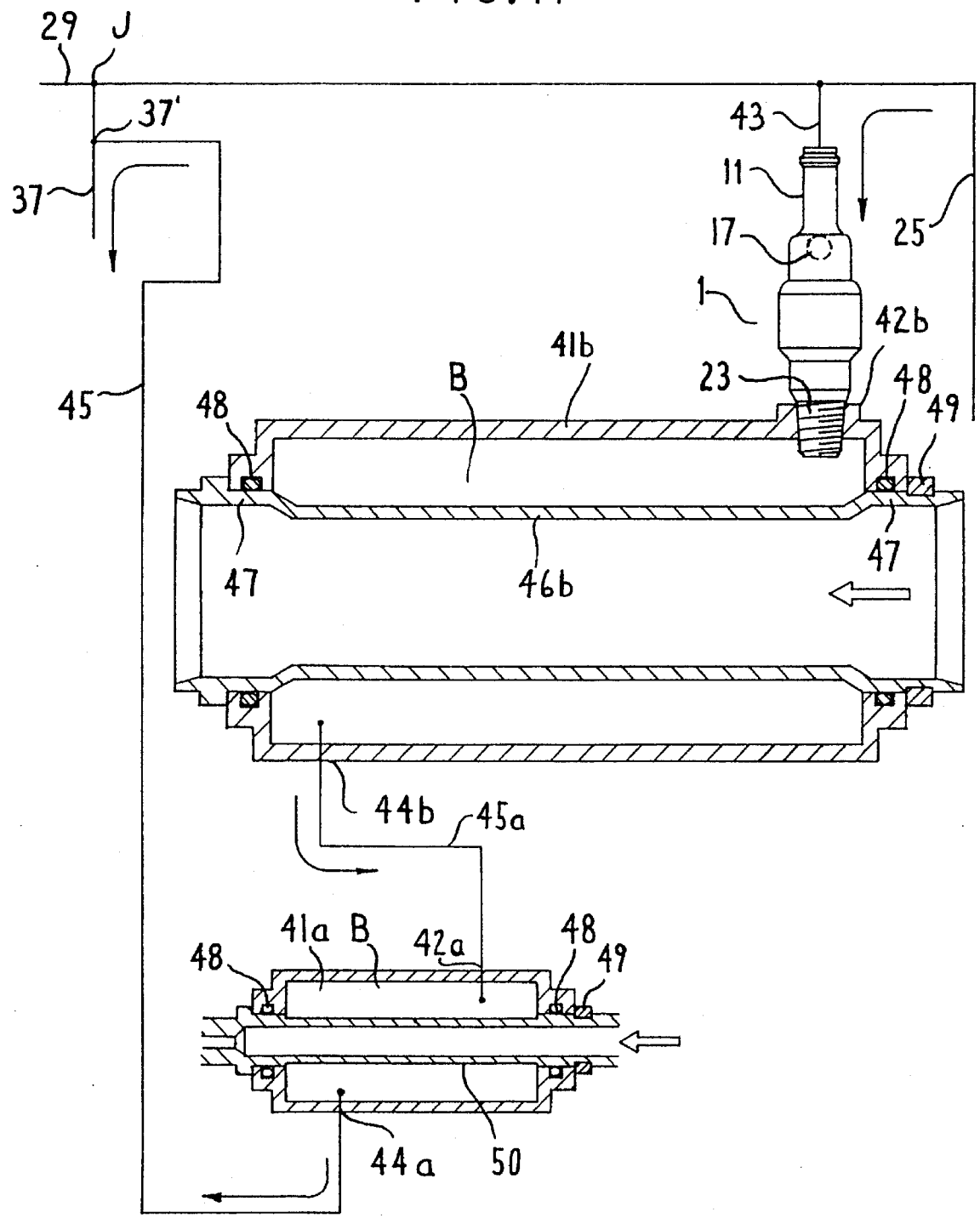
FIG. 11 is a schematic sectional view showing a further modification of the system for controlling the throttle body and fuel pipe connected in series.

FIG. 11 shows a further modification. The jacket 41b for the intake pipe 46b is connected to the jacket 41a for the fuel pipe 50 in series. The outlet 44b of the jacket 41b is connected to the jacket 41a at an inlet 42a through a passage 45a.

Thus, the thermostat 1 controls the temperatures of the intake air in the intake pipe 46b and the fuel in the fuel pipe 50 to constant values at the same time, respectively.

Figure 12:
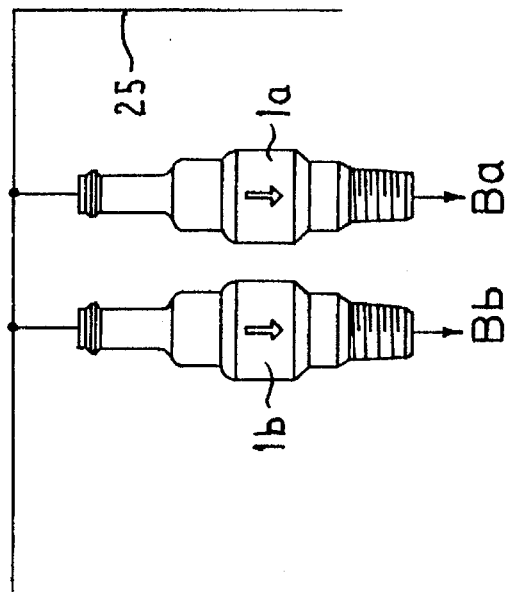
FIG. 12 is a schematic sectional view showing a further embodiment of the present invention.

FIG. 12 shows a further embodiment of the present invention. A pair of thermostats 1a and 1b are connected in parallel to the coolant passage 25 at the housing part 11. Both thermostats 1a and 1b are set to different valve actuating temperatures, for example 40° C. (Ba) and 50° C. (Bb). The thermostats 1a and 1b are connected to respective jackets. Thus, the system of the present invention can be used for controlling the temperature of differing elements to various values.

Figure 13:
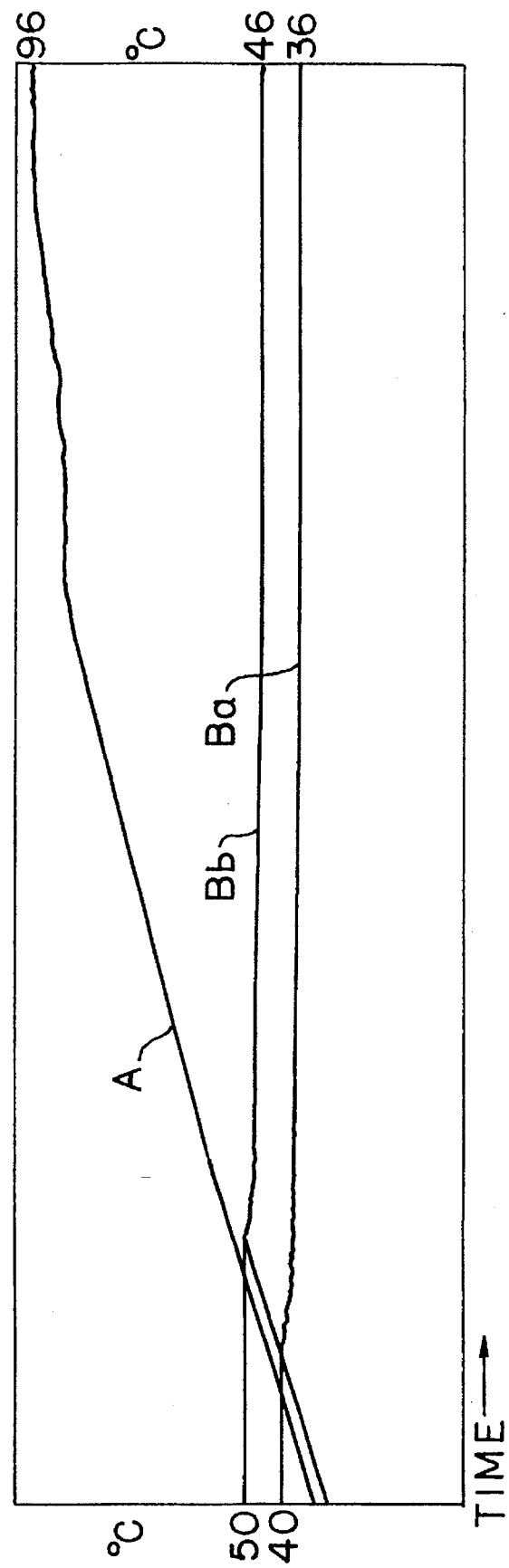
FIG. 13 shows a graph showing variations of the temperatures of Ba and Bb.

FIG. 13 shows variations of the temperatures of Ba and Bb.

In accordance with the present invention, the thermostat is provided in the cooling system for holding the temperature of the element of the engine constant. Thus, the number of sensors can be reduced to reduce the cost. Furthermore, icing and vapor-lock conditions of the engine are prevented. In addition, it is effective to facilitate complete combustion in the engine, thereby reducing emission and fuel consumption.

While the invention has been described in conjunction with preferred specific embodiments thereof, it will be understood that these descriptions are intended to illustrate and not limit the scope of the invention, which is defined by the following claims.

What is claimed is

1. A constant temperature control system for an electronic fuel injection system of an internal combustion engine having a water jacket, a radiator, a water pump, and a coolant thermostat for controlling temperature of a coolant in a liquid cooling system, comprising:

a control thermostat having an inlet side housing having a valve seat, and an outlet side housing provided with a thermo-actuator having an actuating rod and connected with the inlet side housing to form a valve passage, a valve attached on the actuating rod of the thermo-actuator so as to be engaged with the valve seat in the inlet side housing to close the valve passage, the inlet side housing being communicated with the water jacket so as to introduce a part of the coolant in the water jacket, a heat exchanger providing a conduit as a part of the electronic fuel injection system, the outlet side housing being communicated with an inlet of the heat exchanger, an outlet of the heat exchanger being communicated with an inlet side of the water pump, the thermo-actuator being arranged to close the valve passage when the temperature of the coolant in the outlet side housing is higher than a set temperature of the control thermostat to decrease the temperature of the coolant and to open the valve passage when the temperature of the coolant in the outlet side housing is lower than the set temperature, so that coolant at a downstream side of the valve is kept at a constant temperature, and the temperature of intake air or fuel in the conduit of the electronic fuel injection system is accordingly kept constant.

2. A constant temperature control system for an electronic fuel injection system of an internal combustion engine, said internal combustion engine having a liquid cooling system including a water pump, a water jacket, a radiator, a first coolant passage provided between an outlet of the water jacket and an inlet of the radiator, a second coolant passage provided between an outlet of the radiator and an inlet of the water jacket and including the water pump, a bypass passage provided between the first and second coolant passages, a coolant thermostat having a main valve for closing the second coolant passage, and a bypass valve for closing the bypass passage, the coolant thermostat being provided for controlling the temperature of the coolant, the system comprising:

at least one control thermostat separate from the coolant thermostat and including an inlet side housing having thereon a valve seat surrounding a valve opening, and an outlet side housing, both housings being connected to one another and having means defining a valve passage therein;

means defining a first liquid passageway for providing liquid communication between the inlet side housing and the water jacket so as to permit an introduction of a part of the coolant from the water jacket into the valve passage;

the control thermostat further including a thermo-actuator having thermosensitive means disposed in the outlet side housing, an elongated actuating rod connected to the thermosensitive means so as to be moved in response to changes in the temperature of the coolant in the outlet side housing;

a valve member provided on the actuating rod and oriented to oppose the valve seat in an open position thereof spaced from the valve seat and engage the valve seat in a closed position thereof, the closed position of the valve member closing the valve passage;

means defining a second liquid passageway for providing liquid communication between the outlet side housing and the second coolant passage at an inlet side of the water pump so as to discharge the coolant therein so that the coolant entering the inlet side housing and exiting the outlet side housing passes through the valve passage;

a heat exchanger means provided at a downstream side of the outlet side housing for transmitting heat of the coolant discharged from the outlet side housing to a conduit of the electronic fuel injection system;

the thermosensitive means being provided for closing the valve passage when the temperature of the coolant in the outlet side housing is higher than a predetermined temperature and for opening the valve passage when the temperature of the coolant in the outlet side housing is lower than the predetermined temperature so that coolant at a downstream side of the valve member is kept at a generally constant temperature during engine operation, and the temperature of intake air or fuel in the conduit of the electronic fuel injection system is accordingly kept at a generally constant temperature.

* * * * *